United States Patent [19]
Burgess et al.

[11] Patent Number: 5,942,819
[45] Date of Patent: Aug. 24, 1999

[54] MOTOR BRUSH ASSEMBLY WITH NOISE SUPPRESSION

[75] Inventors: James P. Burgess, Troy; Douglas C. Stolicker, Rochester; David J. Pearson, Sterling Heights; Christopher J. Volpe, Waterford, all of Mich.

[73] Assignee: Alcoa Fujikura Ltd., Brentwood, Tenn.

[21] Appl. No.: 08/616,812

[22] Filed: Mar. 15, 1996

[51] Int. Cl.⁶ .................................................. H02K 5/24
[52] U.S. Cl. ............................... 310/51; 310/239; 310/71
[58] Field of Search .................................. 310/51, 239, 71

[56] References Cited

U.S. PATENT DOCUMENTS

| | | | |
|---|---|---|---|
| 3,924,147 | 12/1975 | Tarnow et al. | 310/68 |
| 4,293,789 | 10/1981 | King | 310/239 |
| 4,329,605 | 5/1982 | Angi et al. | 310/68 R |
| 4,673,837 | 6/1987 | Gingerich et al. | 310/239 |
| 4,819,130 | 4/1989 | Moy | 361/302 |
| 4,845,393 | 7/1989 | Burgess et al. | 310/51 |
| 5,196,750 | 3/1993 | Strobl | 310/239 |
| 5,196,796 | 3/1993 | Ade et al. | 310/51 |
| 5,243,247 | 9/1993 | Schmidt | 310/239 |
| 5,563,462 | 10/1996 | Strobl et al. | 310/71 |

*Primary Examiner*—Thomas M. Dougherty
*Assistant Examiner*—Karl Eizo Tamai
*Attorney, Agent, or Firm*—Gifford, Krass, Groh, Sprinkle, Patmore, Anderson & Citkowski, P.C.

[57] ABSTRACT

A combination motor brush support and electromagnetic suppression circuit comprises an assembly having a base which is affixable to a portion of a motor housing and which supports all components requiring precise mechanical alignment, including motor brushes, brush guides and brush springs. The base can also support the choke coils, and at least some of the capacitors of the noise suppression circuitry. The base includes a terminal support board affixed to, and projecting therefrom. The terminal support board has at least one of the capacitors of the noise suppression circuitry retained thereupon, and provides a set of motor contact terminals which are in electrical communication with the motor brushes supported on the base. The support member of the present invention functions as its own assembly tool for supporting and retaining the coils, capacitors, springs and the like.

10 Claims, 6 Drawing Sheets

MOTOR BRUSH ASSEMBLY WITH NOISE SUPPRESSION

FIELD OF THE INVENTION

This invention relates generally to electrical motors. More specifically, the invention relates to systems for suppressing electromagnetic noise generated in electrical motors. Most specifically, the invention relates to a motor brush support assembly which includes noise suppression circuitry therein.

BACKGROUND OF THE INVENTION

The electrical systems of motor vehicles are steadily increasing in complexity. A typical motor vehicle includes a large number of relatively low horsepower motors for activating its various systems and accessories. Motor vehicles now often include relatively sophisticated sound systems, radio telephone equipment and microprocessor based controllers. The interaction of these various components can present a problem, since electric motors can generate significant amounts of electromagnetic noise, which may interfere with the operation of other components in the vehicle. As a consequence, radio frequency noise suppression circuitry is frequently included in motor vehicles. As is known in the art, circuits of this type typically include one or more choke coils which act to inductively limit the passage of high frequency electromagnetic signals therethrough. Also, the circuitry frequently includes one or more capacitors disposed so as to pass high frequency signals to ground, while blocking the passage of low frequency or direct current signals. Since even a relatively short length of an electrical conductor can act as an antenna for broadcasting electromagnetic noise throughout a motor vehicle, it is preferred that noise suppression circuitry be disposed as close as possible to the source responsible for the noise. Various noise suppression systems are known in the prior art. For example, U.S. Pat. No. 4,845,393 discloses an end cap for a fuel pump which includes integral noise suppression circuitry. U.S. Pat. No. 4,819,130 discloses an add on noise suppressor which can be installed onto an ignition coil.

The present invention is directed to a noise suppression system which is an integral part of a motor brush support assembly. The system of the present invention is rugged, reliable and easy to fabricate. It is configured so that all parts requiring precise mechanical tolerances are supported on a single, base portion so as to facilitate the maintenance of precise tolerancing. As will be described in greater detail hereinbelow, it may be used in combination with a number of standardly configured motors. Furthermore, the various components of the present invention are readily manufactured by straight pull molding, and can function as receivers for retaining and directing the assembly of remaining portions of the system. These and other advantages of the invention will be apparent from the drawings, discussion and description which follow.

BRIEF DESCRIPTION OF THE INVENTION

There is disclosed herein a combination motor brush support and electromagnetic noise suppressor. The system includes a base member which is typically an annular body which is affixable to a motor housing and which includes a central opening defined therethrough. The base member includes a plurality of motor brushes and associated motor brush springs supported thereupon. The motor brush springs are oriented so as to mechanically engage the brushes and urge them along a path of travel directed toward the central opening of the base member. A plurality of choke coils are supported upon the base member and disposed so that at least one coil is in series electrical relationship with each of the brushes. At least one capacitor is supported on the base and is disposed in a parallel electrical relationship with at least one of the brushes. The system of the present invention further includes a terminal board which projects from the base member. The board supports a plurality of electrical terminals, each in electrical communication with one of the brushes and one of the coils, and also supports at least one capacitor which is in a parallel electrical relationship with at least one of the motor brushes on the base member.

The base may further include a set of protectors which shield each of the brush/spring combinations. In one particular embodiment, the base is a disc shaped member having a first, generally planar face with the brushes and coils supported thereupon; and in some instances, the terminal body projects from this first face at a right angle thereto. In some embodiments, the terminal body may be formed separately from the base, and subsequently joined thereto, as for example by an adhesive or by engagement of a mechanical latch.

The base may further include a circuit board attached thereto, as for example on a second planar surface thereof. The circuit board establishes electrical communication between the brushes and the coils. In other instances, the system further includes a circuit breaker which is disposed in a series electrical relationship between one of the terminals and one of the brushes. The breaker may be supported on the base or on the terminal board. The system may further include a retention ring disposed in the annular opening of the base. The ring functions to prevent undue motion of the brushes during the manufacture, shipping and/or storage of the brush assembly prior to final assembly of the motor.

DETAILED DESCRIPTION OF THE INVENTION

Figure 1:
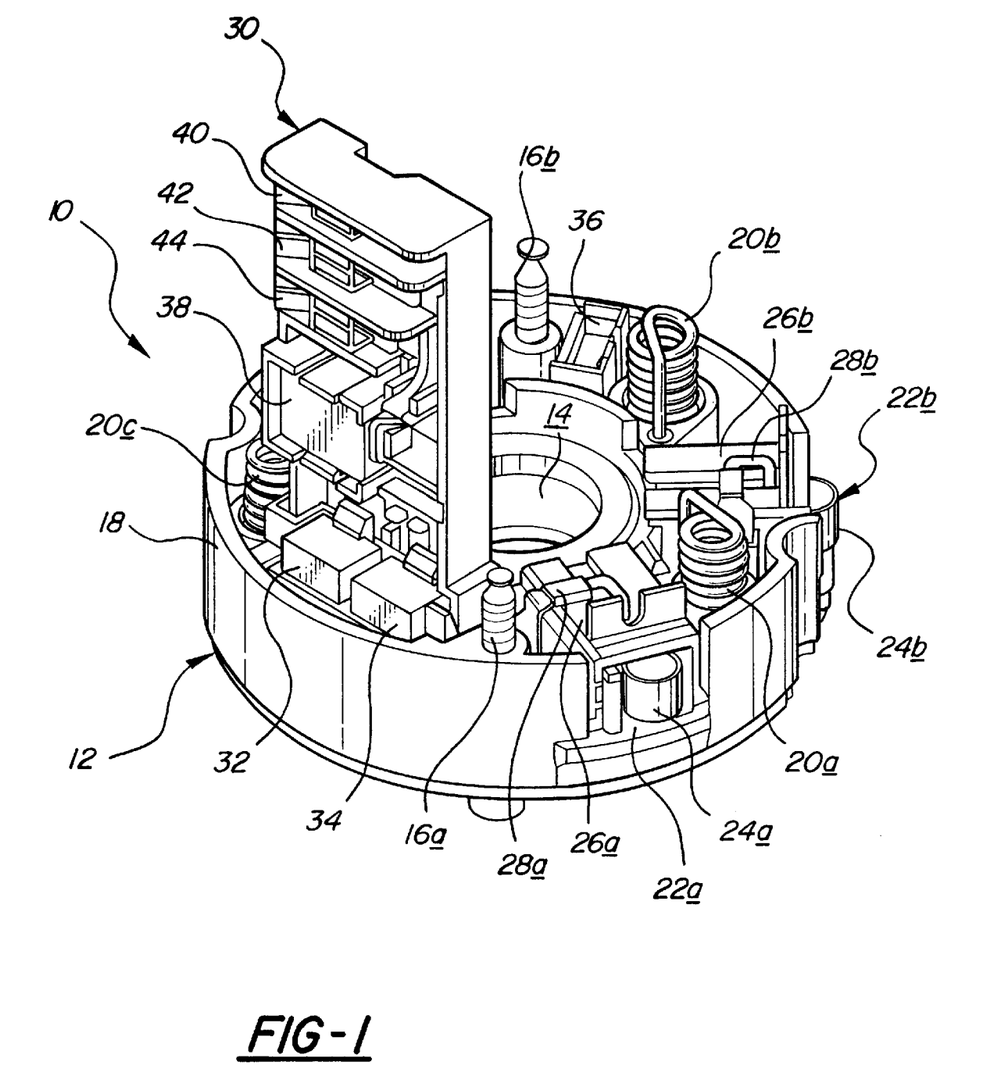
FIG. 1 is a perspective view of one embodiment of the motor brush support and electromagnetic interference suppressor, structured in accord with the principles of the present invention.

The present invention is directed to an assembly which is configured to be incorporated into an electrical motor and which supports the motor brushes as well as electromagnetic noise suppression circuitry. The support member of the present invention may be assembled in a variety of configurations in view of the teaching herein, and may, accordingly, be employed in connection with a variety of motors. Referring now to FIG. 1, there is shown a perspective view of one particular embodiment of motor brush support assembly 10 structured in accord with the principles of the present invention. The assembly of the present invention includes a base portion 12, which in this embodiment is configured as an annular body having a central opening 14 defined therethrough. The base portion 12 is configured to be affixable to a motor housing, and in the illustrated embodiment, a pair of mounting screws 16a, 16b are shown in association with the base 12; however, it is to be understood that other mounting means may be preferable in some cases.

In the illustrated embodiment, the base portion 12 of the assembly 10 includes a generally disc shaped base member 18, which is preferably fabricated from a polymeric material, and which has various other components of the support assembly 10 retained thereupon. As illustrated, the base member 18 includes three choke coils 20a, 20b, 20c supported thereupon. As is known in the art, these coils 20 provide an inductive resistance to passage of high frequency currents therethrough. As is also known in the art, the coils 20 may include a ferromagnetic core therein to further enhance their ability to block high frequency current.

Also visible in FIG. 1 are two motor brush assemblies 22a, 22b. Each brush assembly 22 includes a motor brush (not readily apparent in this figure) together with a brush spring 24a, 24b, and further includes a protective housing 26a, 26b for enclosing the brush and supporting the spring 24. Each brush assembly 22 further includes an electrically conductive lead 28 for establishing electrical communication with the associated brush. The brush protector 26 is configured to be retained by the base member 18; and accordingly, is configured to include tabs or other such retention means which engage correspondingly shaped portions of the base member 18.

As illustrated, the base portion 12 of the assembly 10 includes a pair of capacitors 32, 34, 36 supported thereupon. The number of capacitors employed in the noise suppression circuitry may vary, depending upon the particular application. The base member 18 may include one or more additional sockets which are configured to receive an additional capacitor.

As illustrated, the support member 10 of FIG. 1 also includes a terminal board 30, disposed so as to project from the base portion 12 at an approximate right angle thereto. The terminal board 30 is preferably fabricated from a polymeric material and has at least one capacitor 38 supported thereupon, together with a number of electrical terminals 40, 42, 44. Each of the terminals 40, 42, 44 is in electrical communication with a selected one of the motor brushes, through the choke coils and capacitors which form the noise suppression circuitry employed in the present invention.

Figure 2:
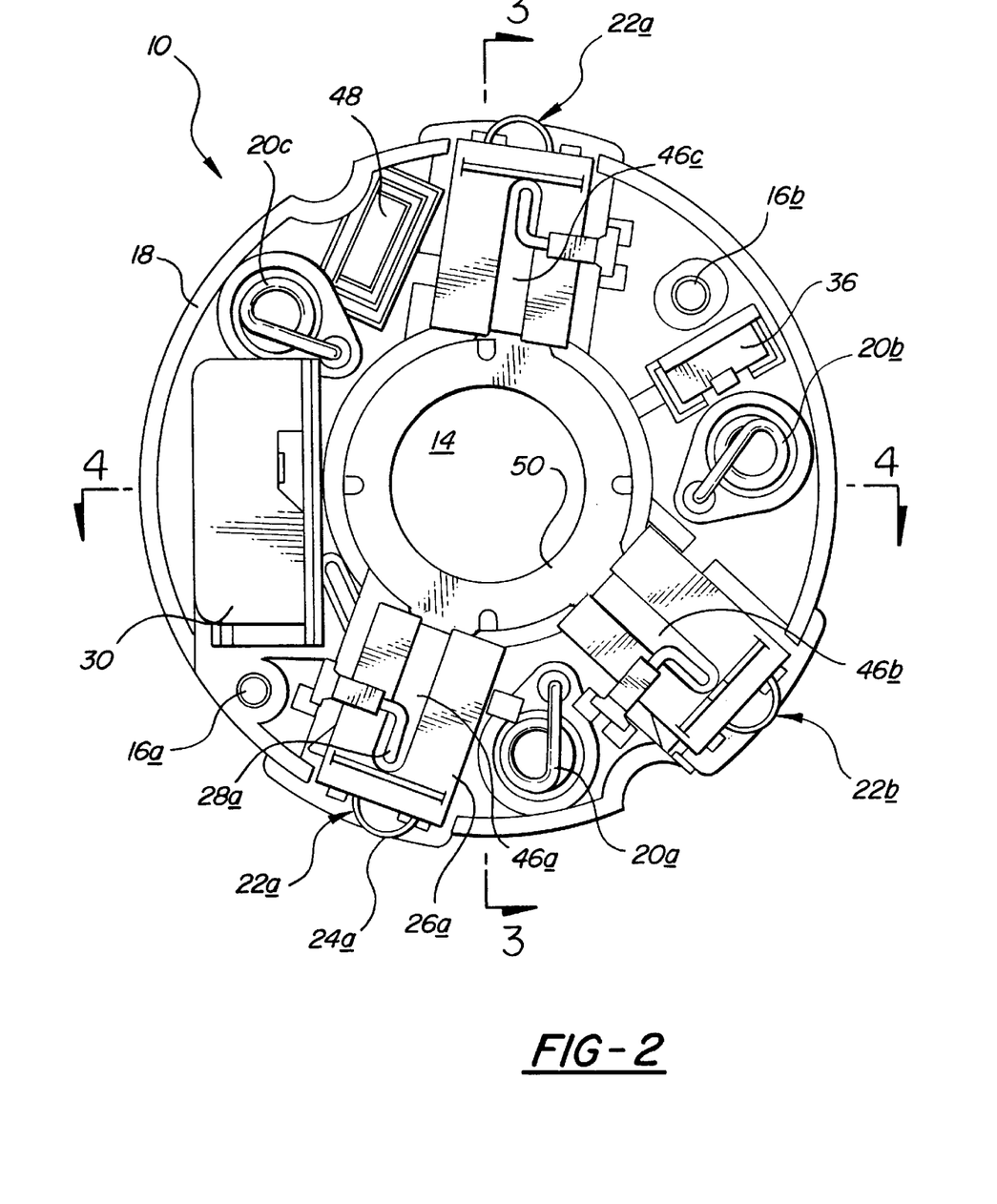
FIG. 2 is a top, plan view of the assembly of FIG. 1.

Referring now to FIG. 2, there is shown a top plan view of the support assembly 10 of FIG. 1. As will be noted, the assembly includes base member 18 and terminal board 30 projecting at approximate right angles therefrom. The base member 18 is a disc shaped member having a central aperture 14, and a generally planar surface configured to support the various components including the choke coils 20 and brush assemblies 22. As will be noted with particular regard to brush assembly 22a, each assembly includes a motor brush 46a having an electrical lead 28a in communication therewith. The brush is biased along a linear path of travel, in the direction of the central aperture 14, by means of a brush spring 24a, and the brush is partially enclosed in a protective housing 26a which also supports the spring 24a. The base 18 is configured to retain the protective housing 26a of the brush assembly 22a, and further configured to support and guide the conductive wire 28a which engages the brush 46a. The remaining brush assemblies 22b and 22c are similarly configured. The base member 18 is further configured to support a capacitor 36 as previously described, and to support, in this embodiment, a circuit breaker 48. FIG. 2 further illustrates the attachment screws 16 that are utilized to affix the support assembly 10 to the remainder of an electrical motor.

FIG. 2 also illustrates a retaining ring 50 which is disposed in the central aperture 14 of the base member 18. The retaining ring 50 contacts each of the motor brushes 46a–46c and prevents them from moving into the central aperture 14. The retaining ring 50 is only utilized during assembly, shipment, storage and installation of the support member 10 of the present invention, after which it is removed so as to permit the motor brushes 46 to engage the appropriate contacts of the motor onto which the support assembly 10 is affixed.

It is a notable feature of the present invention that the base member 18 is configured to support the coils, capacitors, brushes and circuit breakers of the present invention in a predetermined positional relationship. In this manner, the base member 18 also functions as an assembly tool during the fabrication of the support assembly 10. It is another notable feature that all mechanical parts affecting motor operation, and requiring mechanical precision in their placement, (i.e. the brush assemblies) are supported on a unitary portion of the assembly. This arrangements enables the maintenance of close mechanical tolerances in the alignment of these parts. In this manner, all mechanical components requiring precise tolerances are localized on a single member, thereby increasing the reliability and decreasing the cost of the unit.

Figure 3:
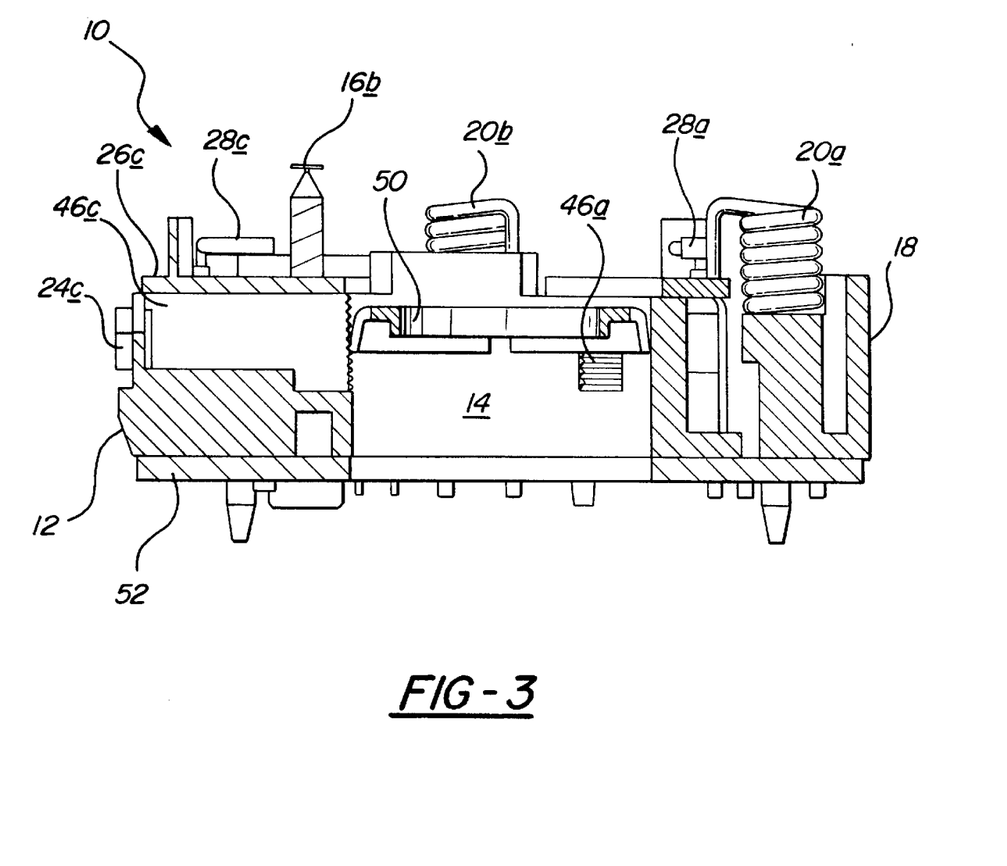
FIG. 3 is a cross-sectional view of the assembly of FIG. 2 taken along line 3—3.

Referring now to FIG. 3, there is shown a cross-sectional view of the assembly of FIG. 2 taken along lines 3—3. The sectional view of FIG. 3 shows a cutaway portion of a brush assembly including motor brush 46c, associated brush spring 24c, protective housing 26c and conductive wire 28c. The drawing further illustrates a portion of another brush 46a and associated conductive wire 28a.

FIG. 3 further illustrates the central aperture 14 of the base member 18 and depicts the manner in which the retainer ring 50 operates to retain the motor brushes 46a, 46c. It will further be noted from FIG. 3 that the base portion 12 includes a circuit board 52 disposed along a bottom, planar surface of the base member 18. The circuit board 52 assists in establishing electrical intercommunication between the coils, capacitors, terminals and brushes comprising the electrical circuitry of the present invention. In some embodiments, the circuit board 52 may be dispensed with, and electrical intercommunication established, upon the base member 18; however, in the illustrated embodiment, it has been found advantageous to include the circuit board 52. The circuit board 52 supports current carrying structures and not any of the brush assemblies or such parts requiring precise mechanical tolerancing. As noted above, all of such parts are supported on the base only.

Figure 4:
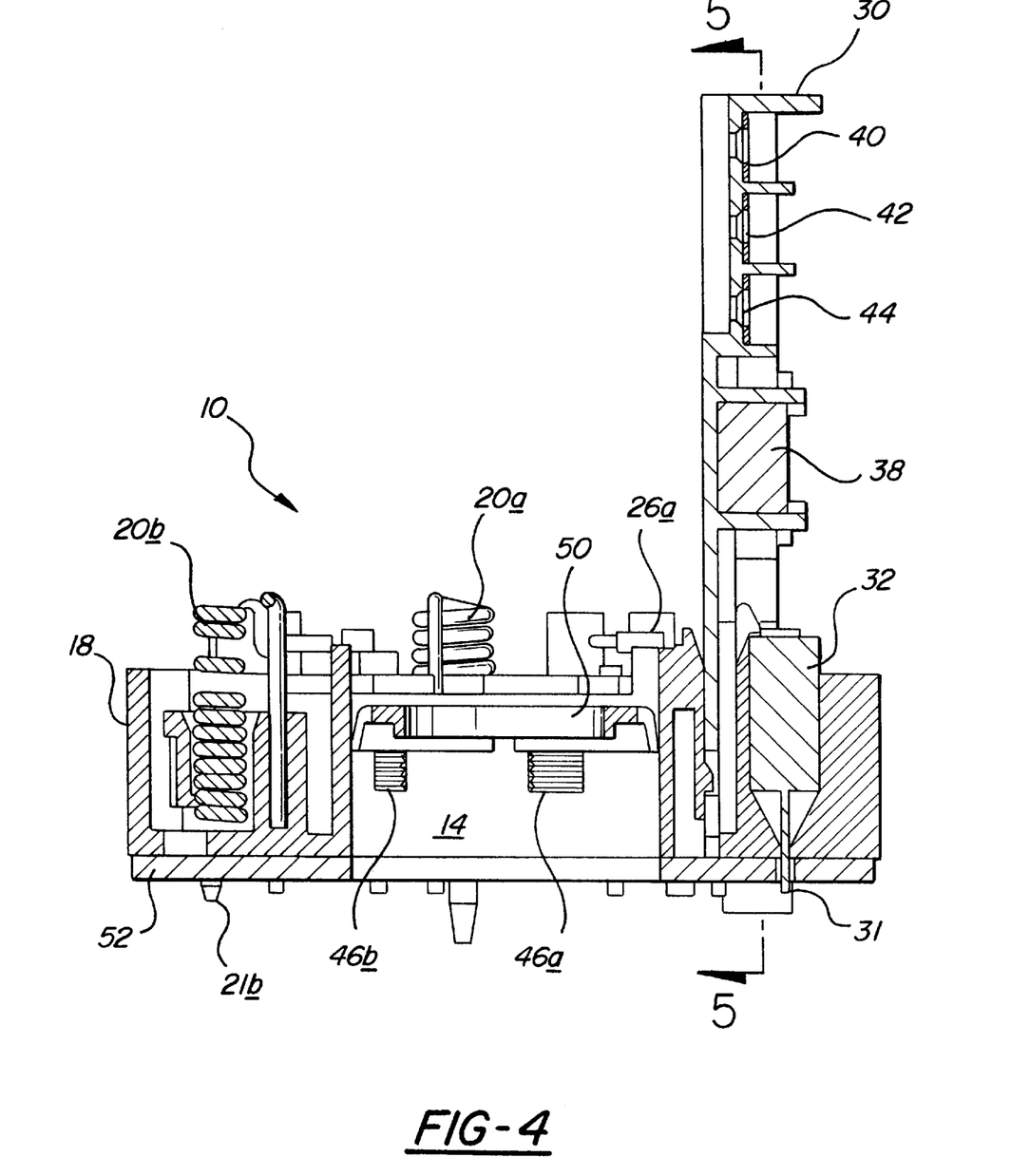
FIG. 4 is a cross-sectional view of the assembly of FIG. 2 taken along line 4—4.

Referring now to FIG. 4, there is shown a cross-sectional view of the support assembly 10 of FIG. 2, taken along line 4—4. FIG. 4 shows one of the coils 20b in partial cross-section, and further depicts a portion of another coil 20a. With regard to coil 20b, it will be noted that the terminal end 21b of the coil 20b passes through the base member 18 and circuit board 52 and is exposed for interconnection thereupon.

FIG. 4 further depicts the retaining ring 50 as disposed in the central aperture 14 of the base member 18. The terminal board 30 is fitted into, and supported by, the base member 18, as is best seen in the FIG. 4 illustration, and the terminal board includes three terminals 40, 42 and 44, together with a capacitor 38. Another capacitor 32 is supported in the base member 18 proximate to the terminal board 30. It will also be noted that a lead 31 of the capacitor 32 projects through the circuit board 52 for interconnection thereupon.

Figure 5:
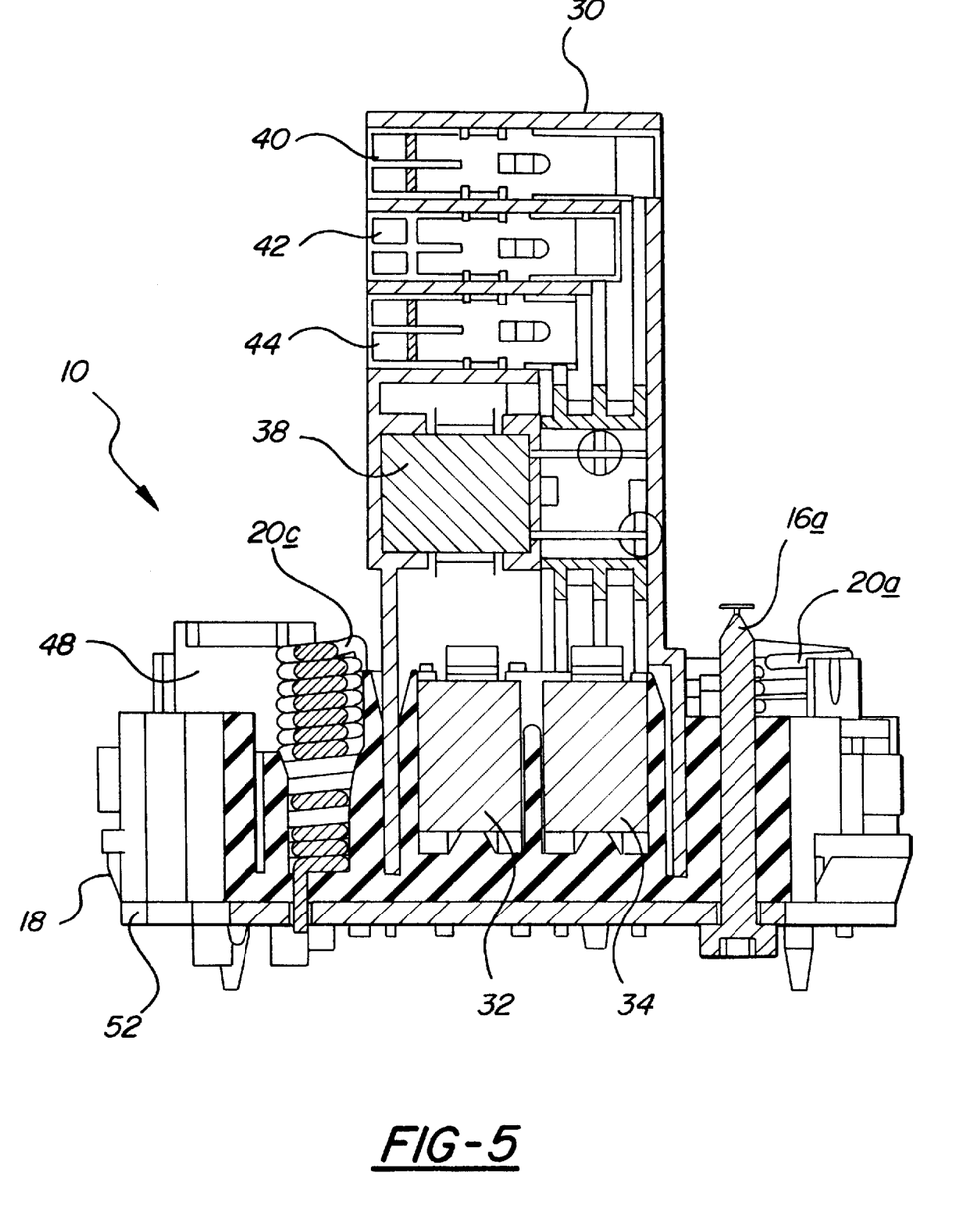
FIG. 5 is a cross-sectional view of the assembly of FIG. 4 taken along line 5—5.

Referring now to FIG. 5, there is shown a cross-sectional view of the assembly of FIG. 4 taken along line 5—5. FIG. 5 best illustrates the terminal board 30 and the manner in which it engages, and is supported by, the base member 18. FIG. 5 clearly illustrates the three terminals, 40, 42, 44, which in this instance are spring-type terminals adapted to receive and retain a blade contact. A capacitor 38 is supported upon the terminal board 30, and other capacitors 32 and 34 are supported upon the base member 18 as noted previously. Also visible in the FIG. 5 drawing are two of the coils 20a, 20c and the circuit breaker 48, as well as an attachment screw 16a and the circuit board 52.

It is to be understood that the motor brush support/ electromagnetic interference suppressor of the present invention may be implemented in a variety of configurations. The number and values of the choke coils and capacitors will depend upon the number of motor brushes employed, and the parameters of the expected electromagnetic fields. In general, the noise suppression circuitry will be arranged so that a choke coil, which operates to provide an impedance, is interposed between the source of electromagnetic noise, namely the motor winding and brush, and the terminals of the assembly of the present invention. It is also desirable that a capacitor be disposed between ground and the line energizing the brush and associated winding. This capacitor should be preferably at a point between the brush and the coil.

Figure 6A:
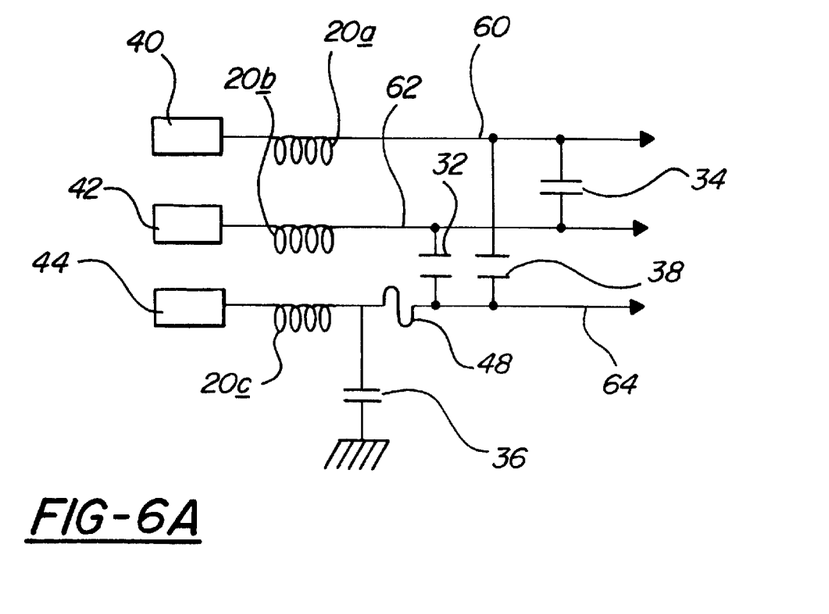
FIG. 6a is a circuit diagram for one embodiment of an electromagnetic noise suppression circuit which may be incorporated in the present invention.

Referring now to FIG. 6a, there is shown an electromagnetic noise suppression circuit which may be utilized in an assembly generally similar to that shown in the foregoing figures. The circuit includes three terminals 40, 42 and 44, each of which energize an associated motor brush and winding (both not shown). The first terminal 40 communicates with a first choke coil 20a, which in turn delivers power to a line 60. The second terminal 42 similarly communicates with a second choke coil 20b and has a power line 62 running therefrom. The third terminal 44 communicates with a third choke coil 20c and has a power line 64 running from it. As will be seen, the third line 64 has a circuit breaker 48 in series therewith. It will also be noted that a capacitor 34 connects first line 60 to the second line 62, and another capacitor 38 connects the first line 60 to the third line 64, while a third capacitor 32 connects the second line 62 to the third line 64. A fourth capacitor 36 connects the third line 64 to ground. This circuit arrangement will prevent the propagation of radio frequency noise from the motor windings, back through and out of the terminals 40, 42 and 44. In operation, the choke coils 20a, 20b, 20c function to impede high frequency signals, such as radio frequency noise, while permitting DC or low frequency current to pass therethrough relatively unimpeded. The capacitors 32, 34, 36 and 38 all act as opens to direct current, but as conductors to high frequency current. Therefore, radio frequency signals traveling along any of the lines 60, 62, 64 will eventually pass to ground.

In a typical assembly for use in connection with a windshield wiper motor for vehicular applications, capacitors 32, 34 and 38 are typically 1.0 microfarad capacitors; whereas capacitor 36 is typically a 0.1 microfarad capacitor.

Figure 6B:
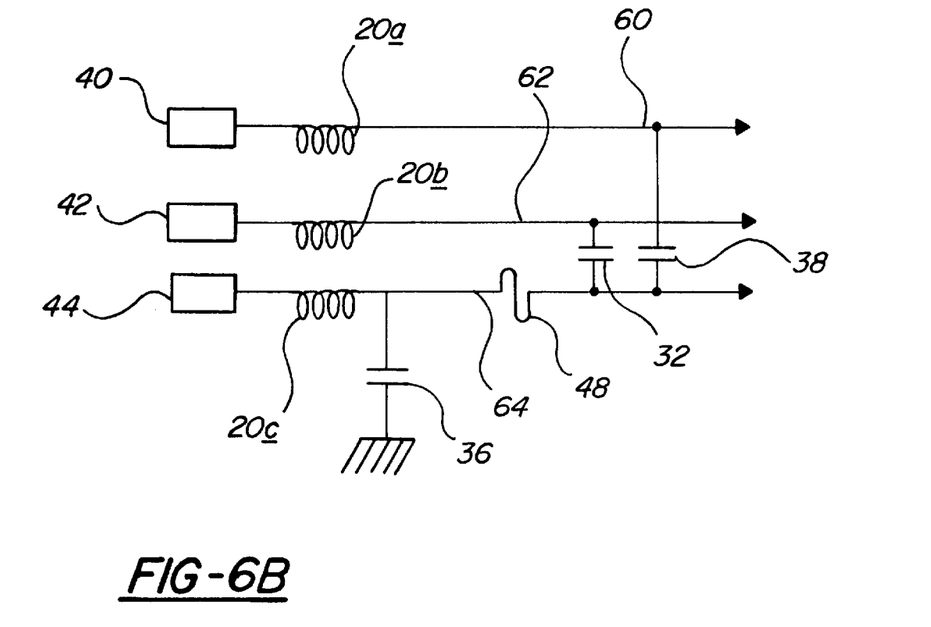
FIG. 6b is a circuit diagram for another embodiment of an electromagnetic noise suppression circuit which may be incorporated in the present invention.

Referring now to FIG. 6b, there is shown another version of noise suppression circuitry which may be implemented in the previously illustrated embodiments of the invention. The FIG. 6b circuitry includes first terminal 40 having a first line 60 in electrical communication therewith via choke coil 20a. A second terminal 42 communicates with a second line 62 through a choke coil 20b and a third terminal 44 communicates with a third line 64 through a third coil 20c. As in the previous embodiment, a circuit breaker 48 is preferably disposed in series, in the third line 64.

In the FIG. 6b embodiment, first line 60 is connected to the third line 64 by a capacitor 38, while the second line 62 is connected to the third line 64 by a capacitor 32. The third line 64 is connected to ground by a capacitor 36. As in the previous embodiment, a high frequency conducting current path is established between the lines 60, 62 and 64, and ground, while choke coils 20a–20c are disposed to block radio frequency signals from traveling from the motor to the terminals 40, 42 and 44. In one preferred embodiment of the invention, the circuitry of FIG. 6b includes capacitors 32 and 38 which are 0.68 microfarad capacitors, and capacitor 36 which is a 0.1 microfarad capacitor.

Numerous modifications and variations of the circuitry of the present invention may be implemented. In those instances where a larger or smaller number of motor brushes and windings are employed, the number of coils and capacitors may be adjusted accordingly. Also, the values of the capacitors and inductor coils will depend upon the characteristics of the motor and electromagnetic noise generated thereby.

While the invention was primarily described with reference to a three terminal device for use with a windshield wiper motor, other modifications and variations thereof may be employed for differently configured motors. Therefore, it is to be understood that the foregoing drawings, discussion and description are merely meant to illustrate particular embodiments of the invention, and are not meant to be limitations upon the practice thereof. It is the following claims, including all equivalents, which define the scope of the invention.

We claim:

1. A combination motor brush support and electromagnetic interference suppressor comprising:

A. A base portion, affixable to a motor housing, said base portion including a base member having all mechanical components of said support member which affect motor performance supported thereupon, and further including:

a plurality of motor brushes supported upon said base member;

a plurality of motor brush springs supported upon said base member, each spring being in mechanical engagement with a corresponding one of said brushes and operative to urge said brush along a path of travel;

a plurality of choke coils supported upon said base member, said choke coils being disposed so that at least one of said plurality of coils is in a series electrical relationship with each motor brush; and at least one capacitor supported upon said base member, said at least one capacitor disposed in a parallel electrical relationship with at least one of said motor brushes; and B. A terminal board which projects from said base member at approximate right angles thereto, said terminal board including:

a plurality of electrical terminals supported thereupon, each terminal in electrical communication with one of said motor brushes and one of said choke coils; and at least one capacitor supported upon said terminal board, said at least one capacitor disposed in a parallel electrical relationship with at least one of said motor brushes.

2. A support member as in claim 1, wherein said base member further includes a brush/spring protector supported thereupon in association with each of said motor brushes.

3. A support member as in claim 1, wherein said base member is a disc shaped member having a first, generally planar face with said brushes, brush springs and coils supported upon said first face.

4. A support member as in claim 1, wherein said terminal board is a separately formed member which is joined to the base member.

5. A support member as in claim 4, wherein said terminal board includes engagement means for mechanically attaching it to said base member.

6. A support member as in claim 1, wherein said base portion further includes a circuit board attached to said base member for establishing electrical communication between said brushes and said choke coils.

7. A support member as in claim 1, further including a circuit breaker disposed in a series electrical connection with one of said terminals and one of said motor brushes.

8. A support member as in claim 7, wherein said circuit breaker is supported on said base member.

9. A support member as in claim 1, wherein said base member is configured as an annular body having a central opening defined therethrough.

10. A support member as in claim 9, further including a retention ring removably retained in the central opening defined in the base member, said retention ring being operative to restrict the travel of the motor brushes.

\* \* \* \* \*